Figure 1:
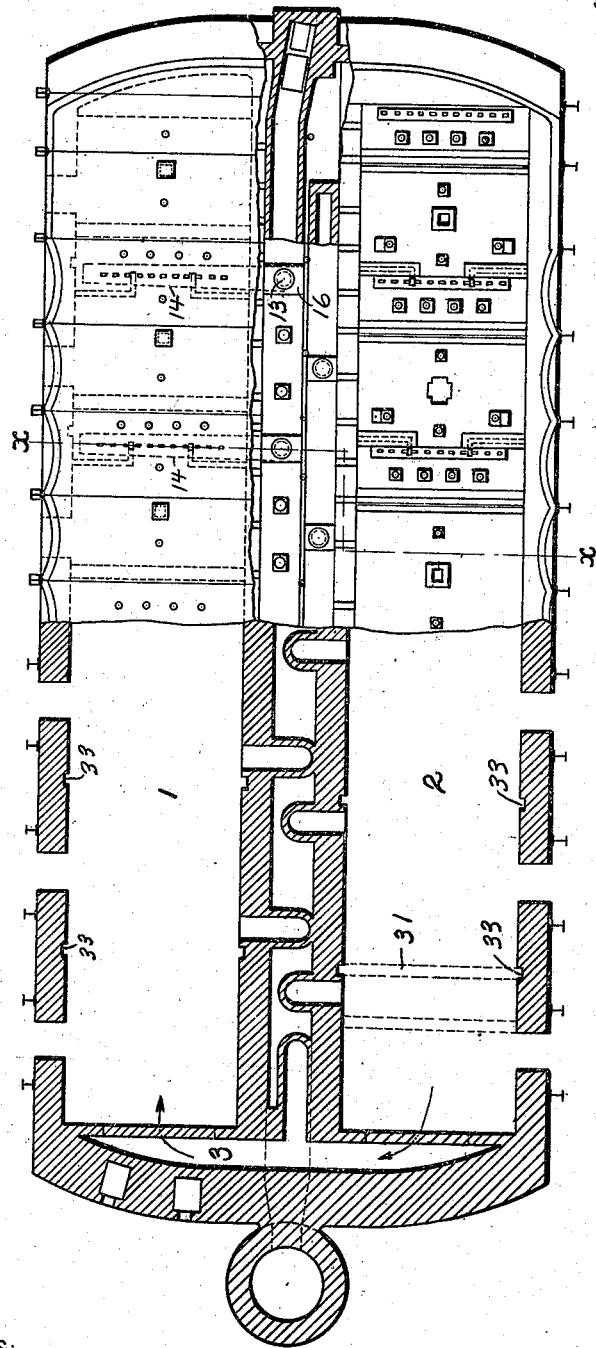

No. 868,059. PATENTED OCT. 15, 1907.
P. L. YOUNGREN.
TUNNEL KILN.
APPLICATION FILED JULY 18, 1905.

3 SHEETS—SHEET 1.

WITNESSES:

INVENTOR
Peter L. Youngren
BY
ATTORNEYS

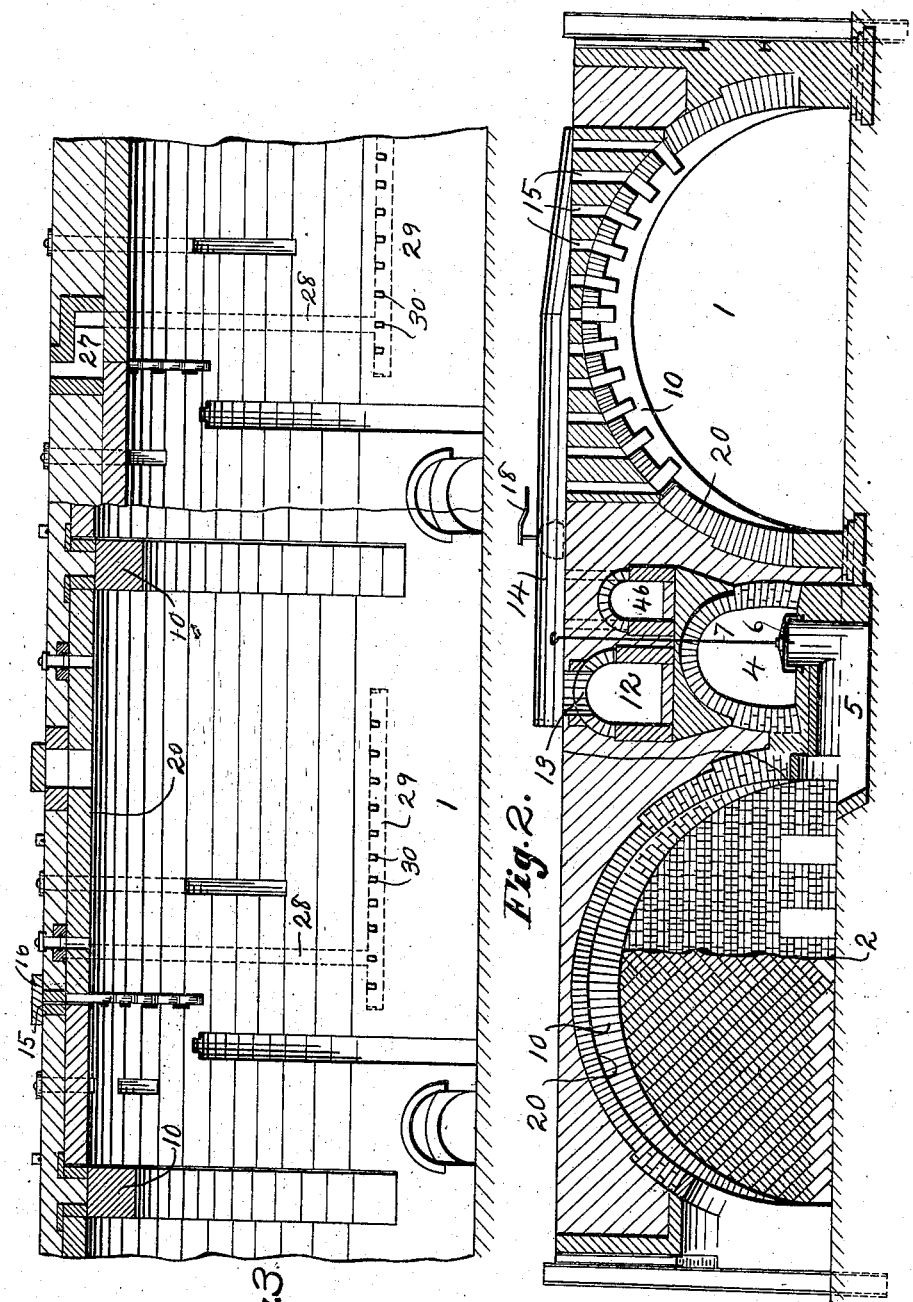

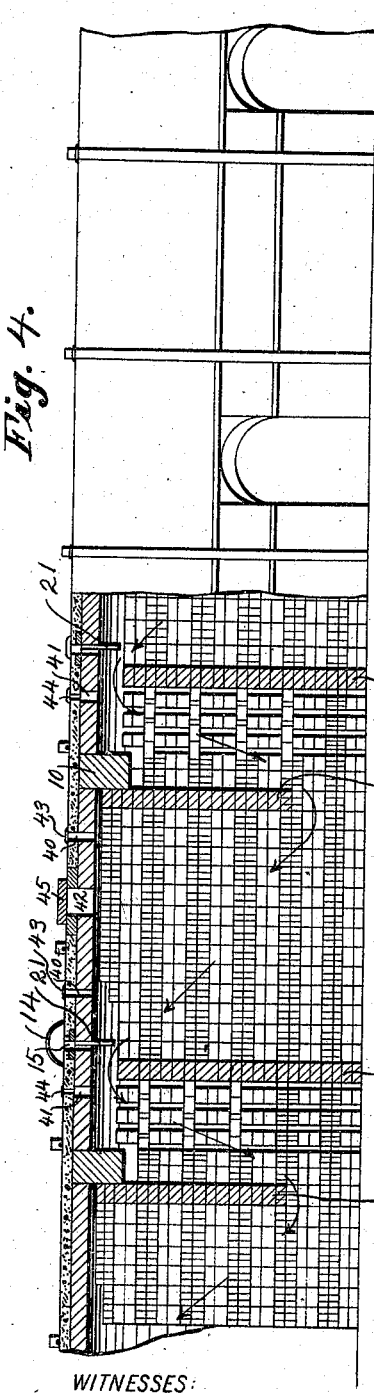
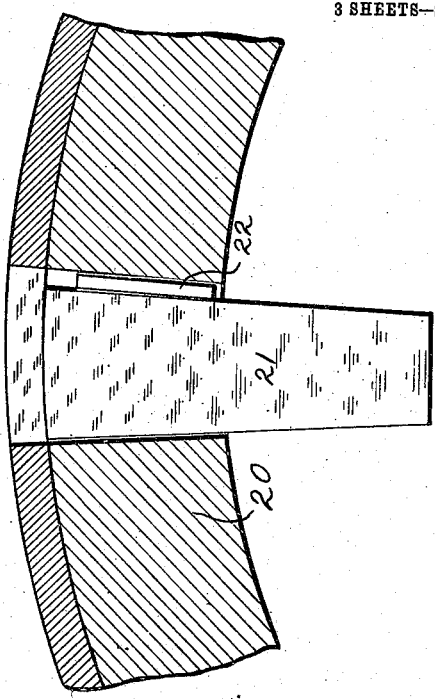
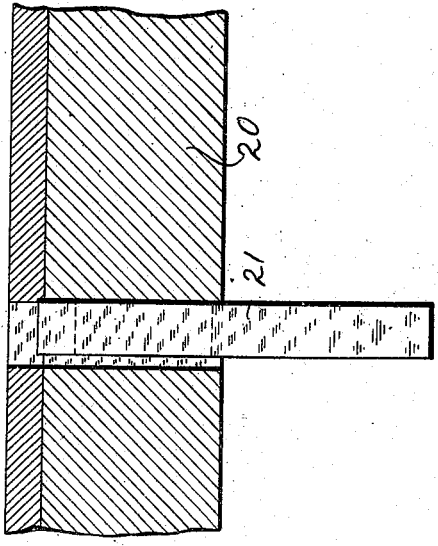

UNITED STATES PATENT OFFICE.

PETER L. YOUNGREN, OF MILWAUKEE, WISCONSIN.

TUNNEL-KILN.

No. 868,059.     Specification of Letters Patent.     Patented Oct. 15, 1907.

Application filed July 18, 1905. Serial No. 270,247.

*To all whom it may concern:*

Be it known that PETER L. YOUNGREN, a citizen of the United States, residing at Milwaukee, county of Milwaukee, and State of Wisconsin, has invented new and useful Improvements in Tunnel-Kilns, of which the following is a specification.

My invention relates to improvements in kilns and pertains especially to that class of kilns which are known as tunnel kilns, and in which the brick, or other material to be baked, is piled successively in various sections or portions of the tunnel, and the process of baking carried on continuously; the completed bricks being removed from the section in the rear of those which are being fired, and green bricks being piled in the section in advance of those which are being fired or dried preparatory to firing.

The objects of my invention are first,—to provide means for thoroughly mixing the combustible air and gas, and distributing the same, together with the heat of combustion, to the bricks of the section which is being fired; second,—to provide means whereby partition walls may be formed between the sections, of green bricks, which will not leave openings when shrunken by the baking process; the bricks composing such wall being removed, when baked, with the other bricks.

In the following description reference is had to the accompanying drawings, in which Figure 1 is a plan view of a kiln embodying my invention and showing one end thereof in horizontal section, drawn to a plane a short distance above the floor of the kiln, and showing also the other end of the kiln partially stripped of the clay or other filling usually applied thereto. Fig. 2 is a transverse sectional view drawn on line x—x of Fig. 1. Fig. 3 is a vertical sectional view, partly on central axis, and partly on axis of branch duct for auxiliary gas flue. Fig. 4 is a side view, partly in vertical section on the longitudinal axis of one of the tunnels. Fig. 5 is a detail view, in longitudinal section, showing one of the gas flues provided with a spreader for distributing the gas. Fig. 6 is a detail view in transverse section, showing the same flue and spreader.

Like parts are identified by the same reference characters throughout the several views.

1 & 2 are the tunnels, preferably arranged in pairs, with connected end flues 3 as best shown in Fig. 1. Between the tunnels 1 & 2 is a main draft flue 4 having branch draft flues 5 leading from the respective tunnels 1 & 2 (at suitable intervals), as also shown in Figs. 1 & 2. The draft through the flues 5 is regulated by dampers 6, which are operated from the top of the kiln by means of rods 7.

Each of the tunnels is provided with drop arches 10 arranged at intervals throughout their length and the space between any two of these drop arches constitutes a section of the tunnel; each such section being provided with one branch draft flue 5 leading to the main draft flue 4. Gas from any suitable source of supply is conveyed through a main gas flue 12 and delivered to the respective tunnel sections through branch gas flues 13, portable gas conductors 14, and a set of delivery flues 15, leading downwardly through the top of the kiln into the corresponding tunnel section. The branch flues 13 and the delivery flues 15 are normally covered by suitable caps 16, which are removed for any given section, when it is desired to deliver gas thereto, and the gas conductor 14 adjusted to cover the flues 13 & 15 from which such caps are removed. The gas conductor 14 consists of a sheet metal semi-cylindrical hood which is preferably provided with a damper 18, whereby the flow of gas may be regulated.

The delivery flues 15 for each section are arranged in a transverse row and assuming that the direction of the draft is from right to left as indicated by arrows in Fig. 4, these flues will be located in front or at the right of the drop arch 10 at the left hand end of such section; about one-third of the section being between the flues 15 and the left hand drop arch. The flues 15 preferably extend through the main arch 20 in radial lines, and gas spreaders 21, preferably consisting of a piece of tile of key-stone shape, are inserted in these flues, with projecting ends extending inwardly into the tunnel space, whereby the flue is partially filled and the gas permitted to pass therethrough along the rear side face of the spreader. The spreaders are preferably inserted from within the tunnel and are secured in position by a shim 22 inserted at one edge of the spreader; the latter being then permitted to drop inwardly and become wedged between such shim and the opposing walls of the flue. With this construction any damaged spreader may be removed by first pressing the same outwardly to permit the removal of the shim, which thus releases the spreader.

It will be observed in Figs. 1 and 3 that auxiliary inlet flues 27 leading downwardly from beneath the gas conductor 14 are offset in the wall of the kiln and extend outwardly and downwardly, as best shown at 28 in Fig. 3, to horizontal distributing flues 29, best shown in Fig. 3; the gas being permitted to escape from said distributing flues 29 through gas inlets 30 at the sides of the loose bricks in the section.

The bricks are piled in the respective sections of the tunnel in the ordinary manner to provide openings or passage ways for the air and burning gases, but in the rear of the gas inlet flues 15, a solid partition wall 31 is constructed of green bricks, which wall extends upwardly to a point near the top of the kiln. The ends of this wall are arranged to extend into suitable recesses 33 in the side walls of the kiln whereby the shrinking of the green brick wall leaves no space at the ends for the passage of air. The green bricks composing this temporary partition wall 31 are preferably piled angularly as shown, and are arranged to pitch in opposite directions toward a transverse plane which cuts the wall preferably at the center. With this construction, the bricks are permitted to settle together and take up the shrinkage so that no spaces will be left for the passage of any considerable body of air through the wall. This wall 31 is located in such a position that the air traversing the tunnel is compelled to pass upwardly under and between the gas spreader 21 and over the top of the wall 31 and then downwardly through the brick between the wall 31, and another solid wall 35, which extends from a point in the lower portion of the kiln upwardly and along the rear face of the drop arch 10. The wall 35 rests upon loosely laid brick in the bottom of the kiln, which bricks are arranged with open spaces or passages for the air and burning gases, whereby the latter is delivered from one section to another, and is finally permitted to pass out from one or more of the branch draft flues 5, these being preferably arranged to receive the air and gas from between two temporary partition walls 31 & 35. The wall 35 may, if desired, be laid in horizontal courses since the shrinkage of the bricks composing this wall will have no detrimental effect by permitting the air to pass through the wall, the air at this point being in a highly heated condition, while the air passing upwardly over the wall 31 is a comparatively low temperature before reaching the gas entering through the flues 15.

The kiln is provided with the usual gage holes 40, peep holes 41 and vent holes 42 all of which are normally covered by caps 43, 44 and 45 respectively. Hot air flues 46 may also be employed, this feature being common to all ordinary kilns of this class.

Having thus described my invention what I claim as new and desire to secure by Letters Patent is,

1. In a kiln a temporary partition wall, composed of green brick arranged in solid courses with an angular pitch in opposite directions on opposite sides of a center line.

2. In a kiln a temporary partition wall composed of brick arranged with a downward and inward pitch toward a vertical plane cutting the wall at an intermediate point.

3. In a kiln a temporary partition wall composed of green brick arranged with an angular pitch longitudinally of the wall.

4. In a kiln a temporary partition wall composed of brick arranged with an angular pitch longitudinally of the wall; together with permanent side walls provided with recesses in which the ends of the partition wall are entered.

5. In a kiln a temporary partition wall composed of green brick arranged with an angular pitch longitudinally of the wall; in combination with a permanent wall formed with a surface lapping the side of the temporary partition wall at one end thereof.

6. In a kiln a temporary partition wall composed of green bricks arranged with an angular pitch longitudinally of the wall; in combination with a top wall having a series of gas inlet flues adapted to deliver combustible gas into the air adjacent to the temporary partition wall, and means for inducing a draft past said flues and over the wall.

7. In a kiln a temporary partition wall composed of green bricks arranged with an angular pitch longitudinally of the wall; in combination with a top wall having a series of gas inlet flues adapted to deliver combustible gas into the air adjacent to the temporary partition wall, and means for inducing a draft past said flues and over the wall, together with a set of auxiliary inlet flues leading downwardly in and along the side walls of the kiln to inlet apertures at the sides thereof.

8. In a kiln a temporary partition wall composed of green bricks arranged with an angular pitch longitudinally of the wall; in combination with a top wall having a series of gas inlet flues adapted to deliver combustible gas into the air adjacent to the temporary partition wall, and means for inducing a draft past said flues and over the wall; together with a set of auxiliary inlet flues leading downwardly in and along the side walls of the kilns to inlet apertures at the sides thereof; together with a second temporary partition wall extending downwardly from the top portion of the kiln in the rear of the first mentioned partition wall, to points near the bottom thereof and supported upon bricks having passages for the air and gases of combustion deflected downwardly by such wall.

9. In a kiln having a gas inlet flue and provided with means for maintaining a draft through the kiln; a shield extending inwardly from the side of the flue first reached by the draft.

10. In a kiln, a gas inlet flue and a shield extending inwardly from one side of the flue; together with means for directing an air current along the edges of the shield.

11. In a kiln provided with means for creating a draft of air therethrough; a partition wall partially subdividing said kiln and over which the air is permitted to pass; a second partition wall arranged with space through which the air may pass near the bottom of the kiln; and means for introducing and distributing combustible gas into the air currents before their passage over the first mentioned wall.

12. In a kiln provided with means for creating a draft of air therethrough; a partition wall partially subdividing said kiln and over which the air is permitted to pass; a second partition wall arranged with space through which the air may pass near the bottom of the kiln; and means for introducing and distributing combustible gas into the air currents before their passage over the first mentioned wall; together with a series of lateral gas inlets adapted for the admission of gas at the sides of the kiln below the top of the first mentioned wall.

13. In a kiln provided with means for creating a draft of air therethrough; a partition wall partially subdividing said kiln and over which the air is permitted to pass; a second partition wall arranged with space through which the air may pass near the bottom of the kiln; and means for introducing and distributing combustible gas into the air currents before their passage over the first mentioned wall; together with gas spreading devices arranged to distribute the gas as it enters the kiln.

14. In a kiln provided with means for creating a draft of air therethrough; a partition wall partially subdividing the kiln, and over which the air is permitted to pass; means for introducing combustible gas into the air above the top of the wall and before its passage over the wall; and means for introducing combustible gas into the air at the sides of the kiln and below the top of the wall.

15. In a kiln provided with means for creating a draft of air therethrough; a partition wall partially subdividing the kiln and over which the air is permitted to pass; and means for introducing combustible gas into the air adjacent to the top of the wall and on the side of air approach.

16. In a kiln provided with means for creating a draft of air therethrough; a partition wall partially subdividing the kiln and over which the air is permitted to pass; and means for introducing combustible gas into the air adjacent to the top of the wall; together with means for distributing said gas comprising a transverse series of gas inlet flues and deflecting plates arranged along the top of the kiln on the side of said partition wall from which the air approaches.

In testimony whereof I affix my signature in the presence of two witnesses.

PETER L. YOUNGREN.

Witnesses:
JAS. B. ERWIN,
LEVERETT C. WHEELER.